(12) United States Patent
Tchervenkov et al.

(10) Patent No.: US 9,973,066 B2
(45) Date of Patent: May 15, 2018

(54) MULTI-LAYER SANDWICH-SHAPED ELECTRIC WHEEL

(71) Applicant: TIDNAB INNOVATIONS INC., Brossard (CA)

(72) Inventors: Jean I. Tchervenkov, Brossard (CA); Sylvain Crevier, Brossard (CA)

(73) Assignee: TIDNAB INNOVATIONS INC., Brossard (CA)

( * ) Notice: Subject to any disclaimer, the term of this patent is extended or adjusted under 35 U.S.C. 154(b) by 261 days.

(21) Appl. No.: 14/891,799

(22) PCT Filed: May 20, 2014

(86) PCT No.: PCT/CA2014/000437
§ 371 (c)(1),
(2) Date: Nov. 17, 2015

(87) PCT Pub. No.: WO2014/183205
PCT Pub. Date: Nov. 20, 2014

(65) Prior Publication Data
US 2016/0134180 A1    May 12, 2016

Related U.S. Application Data

(60) Provisional application No. 61/824,444, filed on May 17, 2013.

(51) Int. Cl.
*H02K 21/12* (2006.01)
*H02K 16/02* (2006.01)
(Continued)

(52) U.S. Cl.
CPC .......... *H02K 16/02* (2013.01); *B60K 7/0007* (2013.01); *B60K 11/02* (2013.01); *B60K 17/046* (2013.01);
(Continued)

(58) Field of Classification Search
CPC ...... H02K 21/24; H02K 1/2793; H02K 23/54; H02K 21/12; H02K 37/125; H02K 1/2713
(Continued)

(56) References Cited

U.S. PATENT DOCUMENTS 4,866,321 A    9/1989   Blanchard et al.
5,646,467 A *  7/1997   Floresta ............... H02K 1/17
                                                 310/154.05
(Continued)

FOREIGN PATENT DOCUMENTS

WO    2007043514    4/2007
WO    2007043685    4/2007

OTHER PUBLICATIONS

Supplementary European Search Report issued in corresponding European Application No. 14798198.9 dated Mar. 7, 2017 (8 pages).
(Continued)

*Primary Examiner* — Thanh Lam
(74) *Attorney, Agent, or Firm* — Hamre, Schumann, Mueller & Larson, P.C.

(57) ABSTRACT

A wheel assembly comprising a wheel-shaped stator plate provided between two wheel-shaped rotor plates, all of which being co-axially attached to a rotation shaft. Each rotor includes a plurality of permanent magnets on the side facing the stator. The stator includes a plurality of coils corresponding in position to the permanent magnets of the rotors. Corresponding magnet faces of the different rotors have opposite orientations, and adjacent magnet faces of the same rotor have also opposite orientations. The rotors are attached to each other to maintain this configuration in place as the rotors rotate. The coils are configured so that each coil generates a magnetic field that extends across the surface of the stator plate to react with corresponding permanent magnets in both rotors, thus maximizing use of the magnetic (Continued)

field generated by the coils and causing the rotor plates to rotate simultaneously. A stream of cooling fluid may be run within the stator plate for reducing overheating.

20 Claims, 12 Drawing Sheets

(51) Int. Cl.
*B60K 11/02* (2006.01)
*H02K 7/116* (2006.01)
*H02K 21/24* (2006.01)
*B60K 7/00* (2006.01)
*B60K 17/04* (2006.01)
*B60K 17/356* (2006.01)
*H02K 1/20* (2006.01)
*H02K 1/27* (2006.01)
*B60K 1/00* (2006.01)
*B60K 1/04* (2006.01)

(52) U.S. Cl.
CPC ............ *B60K 17/356* (2013.01); *H02K 1/20* (2013.01); *H02K 1/2793* (2013.01); *H02K 7/116* (2013.01); *H02K 21/24* (2013.01); *B60K 2001/006* (2013.01); *B60K 2001/0416* (2013.01); *B60K 2007/0038* (2013.01); *B60K 2007/0092* (2013.01); *Y02E 10/725* (2013.01)

(58) Field of Classification Search
USPC .............................. 310/112–114, 156.37, 268
See application file for complete search history.

(56) References Cited

U.S. PATENT DOCUMENTS

| 6,046,518 | A | 4/2000 | Williams |
| 6,049,152 | A | 4/2000 | Nakano |
| 6,958,027 | B2 | 10/2005 | Shimizu et al. |
| 7,002,274 | B2 | 2/2006 | Kim et al. |
| 7,960,884 | B2* | 6/2011 | Miyata ................ H02K 1/2793 |
| | | | 310/114 |
| 2006/0244319 | A1 | 11/2006 | Guo et al. |
| 2007/0024144 | A1* | 2/2007 | Obidniak ............... H02K 21/24 |
| | | | 310/156.36 |
| 2007/0034438 | A1 | 2/2007 | Gotz |
| 2009/0101424 | A1 | 4/2009 | Suzuki |
| 2011/0156519 | A1* | 6/2011 | Wang ................... H02K 1/2793 |
| | | | 310/114 |
| 2014/0009022 | A1* | 1/2014 | Kim ........................ H02K 1/14 |
| | | | 310/114 |

OTHER PUBLICATIONS

Caricchi et al.: "Compact wheel direct drive for EVS"; IEEE Industry Applications Magazine, Nov. 1996, vol. 2, No. 6, pp. 25-32, XP000682020.

* cited by examiner

MULTI-LAYER SANDWICH-SHAPED ELECTRIC WHEEL

BACKGROUND (a) Field

The subject matter disclosed generally relates to an electric wheel.

(b) Related Prior Art

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. The primary problem with conventional gasoline or diesel combustion engines is that they require fossil fuels that are not renewable and contribute to pollution. Consequently, a fuel that is renewable and does not contribute to pollution is desirable.

One alternative to combustion vehicles is hybrid vehicles. Hybrid vehicles include an electrical power source in addition to the internal combustion engine. In particular, the hybrid vehicle may include a gasoline engine, fuel tank, electric motor, batteries, transmission, and electric generator. Various approaches to combining the electrical power source and the internal combustion engine are known, such as a parallel hybrid in which the engine and electric motor can both simultaneously drive the transmission and the series hybrid in which the engine drives the electric generator which charges the batteries or powers the electric motor to drive the transmission.

Some hybrid vehicles are configured to allow connecting the vehicle to an external electric power supply, that is, the hybrid vehicle may be plugged in for charging. There are also battery electric vehicles that are fully powered by the electrical power source. The battery electric vehicle is configured to allow connecting the vehicle to an external power supply, that is, the battery electric vehicle may be plugged in for charging.

Each of the above vehicles use a central engine/motor and requires a transmission in order to transmit the rotation power from the engine/motor to the wheels.

A typical mechanical transmission for fuel powered vehicles allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction.

No transmission system is ever completely efficient and there is always a percentage of energy lost in friction in the axle, gearing, clutch and the like, especially when the vehicle is equipped with an all wheel traction mechanism (AWD).

Another problem associated with conventional vehicles is that substantial amount of the car's weight and storage space is taken for the engine/motor and the transmission system, not to mention the maintenance and replacement parts which are provided in large numbers in each vehicle.

Attempts have been made to overcome these problems by providing in-wheel motors whereby one or more wheels in the vehicle would comprise their own motor, thereby alleviating the need for a central motor and a transmission system. An example for such attempts is provided in co-owned and co-invented International Application No. PCT/CA2012/000673. PCT/CA2012/000673 (which is incorporated herein by reference in its entirety) describes a wheel assembly comprising a plurality of stator units coaxially provided within a rotor. The stator units comprise a plurality of spokes co-centrically provided around a hub/shaft and a coil provided around at least a portion of the spokes for generating an electrical field. The rotor comprises a plurality of magnets provided on an inner periphery of the rotor facing the spokes. The rotor is rotatably attached to the hub/shaft of the stator for rotating around the stator units when the coils are activated. The coils and/or the stator units may be selectively activated and deactivated to avoid overheating.

This type of motors reduces the friction losses experienced in a conventional transmission but they still experience magnetic losses. Additionally, while the overheating in these motors is reduced, it is not completely eliminated and still imposes limitations especially if the type of driving involves extended acceleration and deceleration e.g. if the vehicle is driven in a sport mode or used in racing etc.

Therefore there is a need for an improved wheel motor which is at the same efficient and also allows for extended use without overheating.

SUMMARY

The present embodiments describe such motor.

In one aspect, there is provided a wheel assembly comprising: a first shaft; a first wheel-shaped rotor plate rollably connected to the first shaft, and comprising a plurality of permanent magnets; a second wheel-shaped rotor plate rollably connected to the first shaft, and comprising a plurality of permanent magnets; a wheel-shaped stator plate comprising a plurality of coils; wherein the stator plate is fixedly attached to the first shaft and provided between the first rotor plate and the second rotor plate; wherein adjacent permanent magnets surfaces facing the stator plate of each rotor plate have different polarities, and corresponding permanent magnet faces of each rotor plate have different polarities; and wherein the coils are configured to generate a magnetic field extending across the surface of the stator plate in a substantially perpendicular manner such that the magnetic field generated by each coil reacts with corresponding magnets in both the first rotor plate and the second rotor plate to cause rotation of the rotor plates around the first shaft.

In an embodiment, the coils are configured so that a given magnetic field generated by a given coil repels a first permanent magnet in the first rotor on one side thereof and simultaneously repels a second permanent magnet in the second rotor plate on the other side.

In another embodiment, adjacent coils generate magnetic fields having opposite polarities.

In a further embodiment, the stator plate defines a hollow membrane and comprises a fluid inlet and a fluid outlet for running a cooling fluid there through for reducing overheating during operation of the wheel assembly.

In yet a further embodiment, the first rotor plate and the second rotor plate are attached together.

In another embodiment, the wheel assembly comprises a set of coils on each side of the stator plate. The stator plate may be made of a material which is permeable to magnetic fields. The material could be one of: fiber glass, composite material, and heat resistant plastic.

A gearbox may be attached to the first shaft, the gearbox being configured to change the rotation speed of the first shaft into a new rotation speed and output the new rotation speed using a second shaft for attachment to a wheel of a vehicle.

In an embodiment, the permanent magnets and the coils are provided at or near an external surface of the first and second rotor plates and the stator plate, respectively.

In another embodiment, the permanent magnets include one or more of: rare earth magnets, neodymium magnets, and samarium-cobalt magnets.

In another aspect, there is provided a vehicle comprising: a chassis; and one or more wheels rollably attached to the chassis for driving the vehicle on the ground; at least one of the wheels including a wheel assembly comprising:
  a first shaft;
  a first wheel-shaped rotor plate rollably connected to the first shaft, and comprising a plurality of permanent magnets;
  a second wheel-shaped rotor plate rollably connected to the first shaft, and comprising a plurality of permanent magnets;
  a wheel-shaped stator plate comprising a plurality of coils;
    wherein the stator plate is fixedly attached to the first shaft and provided between the first rotor plate and the second rotor plate; and
    wherein adjacent permanent magnets surfaces facing the stator plate of each rotor plate have different polarities, and corresponding permanent magnet faces of each rotor plate have different polarities; and
    wherein the coils are configured to generate a magnetic field extending across the surface of the stator plate in a substantially perpendicular manner such that the magnetic field generated by each coil reacts with corresponding magnets in both the first rotor plate and the second rotor plate to cause rotation of the rotor plates around the first shaft.

In an embodiment, the vehicle may comprise a radiator and the stator plate defines a hollow membrane and comprises a fluid inlet and a fluid outlet operably connected to the radiator for running a cooling fluid there through for reducing overheating during operation of the wheel assembly.

In a further embodiment, the magnetic field generated by a given coil repels a first permanent magnet in the first rotor on one side and simultaneously repels a second permanent magnet in the second rotor plate on the other side.

In a further aspect there is provided, a wheel assembly comprising: a shaft; a wheel-shaped rotor rollably connected to said shaft, and comprising two rotor plates, each rotor plate comprising a plurality of magnets provided at or near an edge of the rotor plate, wherein adjacent magnets faces have opposite polarities, and respective magnet faces of each rotor plate have opposite polarities; a wheel shaped stator comprising a stator plate statically connected to the shaft and provided between the two rotor plates; said stator plate comprising a plurality of coils, said coils being wired so that adjacent coils generate magnetic fields with opposite directions; wherein the magnetic field generated by the coils extends across the stator plate and repels the magnets of both rotor plates causing rotation of the rotor plates around the shaft.

According to yet a further aspect, there is provided a wheel assembly comprising: a shaft; a wheel-shaped rotor rollably connected to said shaft, and comprising two rotor plates, each rotor plate comprising a plurality of magnets provided at or near an edge of the rotor plate, wherein adjacent magnets have opposite polarities, and respective magnets of each rotor plate have opposite polarities; a wheel shaped stator comprising a stator plate statically connected to the shaft and provided between the two rotor plates; said stator plate comprising a plurality of coils, said coils being wired so that adjacent coils generate magnetic fields with opposite directions; wherein the magnetic field generated by the coils causes repels the magnets of both rotor plates causing rotation of the rotor plates around the shaft.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 14b is an exploded view of the gearbox of FIG. 14a;

DETAILED DESCRIPTION

The embodiments describe a wheel assembly defining a motor and comprising a wheel-shaped stator plate provided between two wheel-shaped rotor plates, all of which being co-axially attached to a rotation shaft. Each rotor includes a plurality of permanent magnets on the side facing the stator. The stator includes a plurality of coils corresponding in position to the permanent magnets of the rotors. Corresponding magnet faces of the different rotors have opposite orientations, and adjacent magnet faces of the same rotor have also opposite orientations. The rotors are attached to each other to maintain this configuration in place as the rotors rotate. The coils are configured so that each coil generates a magnetic field that extends across the surface of the stator plate to react with corresponding permanent magnets in both rotors, thus maximizing use of the magnetic field generated by the coils and causing the rotor plates to rotate simultaneously. A stream of cooling fluid may be run within the stator plate for reducing overheating.

Such wheel assembly reduces magnetic losses and operates for long hours without experiencing overheating. The wheel assembly may have the shape of a thin wheel and may be embedded within existing rims/wheels. Additional layers of rotors and stators may be provided for increasing torque and/or horsepower. This allows for building powerful vehicles with minimal amounts of energy losses.

Preferably, the wheel assembly comprises three wheel-shaped plates co-axially provided around a rotation shaft, giving the wheel assembly the shape of a multi layered sandwich. An example is provided below with reference to FIGS. 1 to 3.

Figure 1:
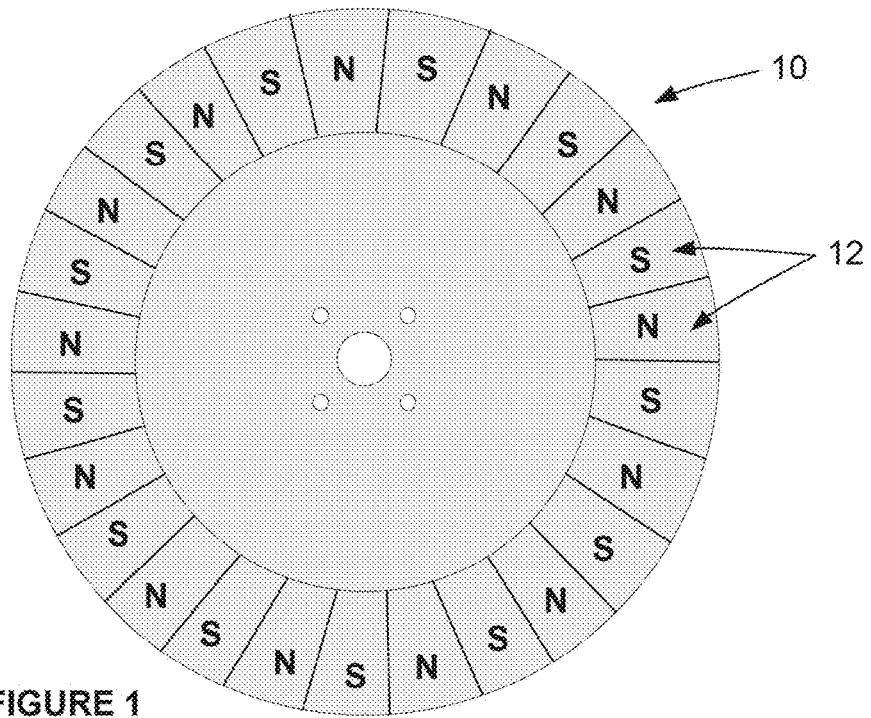
FIG. 1 is a top view of a rotor plate of an exemplary wheel assembly.

FIG. 1 is a top view of a rotor plate of an exemplary wheel assembly. As shown in FIG. 1, the rotor plate 10 defines a wheel shaped plate comprising a plurality of magnets 12 (e.g. permanent magnets, rare earth magnets, neodymium magnets) at or in proximity of the edge. In an embodiment, the magnets 12 are arranged beside each other so that adjacent magnet poles have opposite polarities e.g. north, south, north, south, etc. as shown in FIG. 1.

Figure 2:
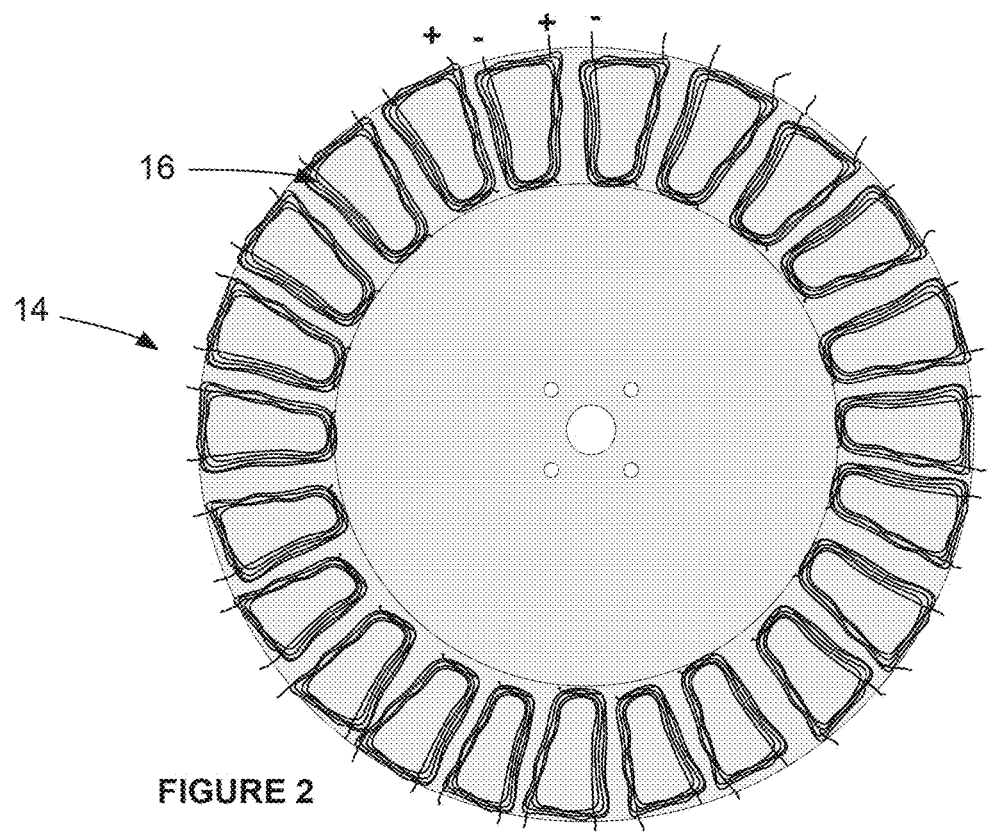
FIG. 2 is a top view of a stator plate of an exemplary wheel assembly.

FIG. 2 is a top view of a stator plate of an exemplary wheel assembly. As shown in FIG. 2, the stator plate 14 comprises a plurality of coils 16 provided at or in proximity of the edge. The coils may be provided in openings and/or cutouts provided in the plate 14 so as to correspond to the magnets 12 of the stator plate 10.

Figure 3:
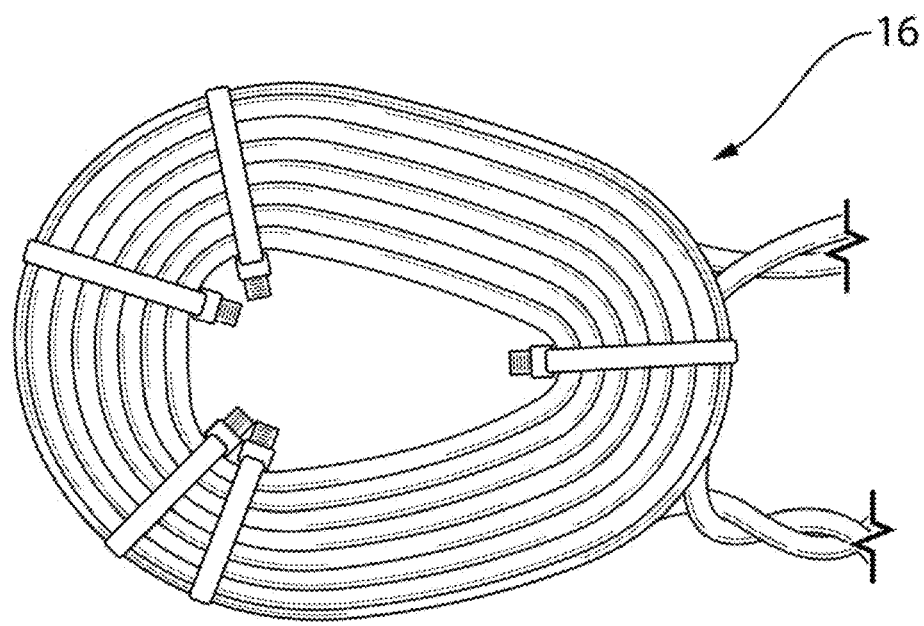
FIG. 3 is a top view of triangular shaped coil in accordance with an embodiment.
Figure 4:
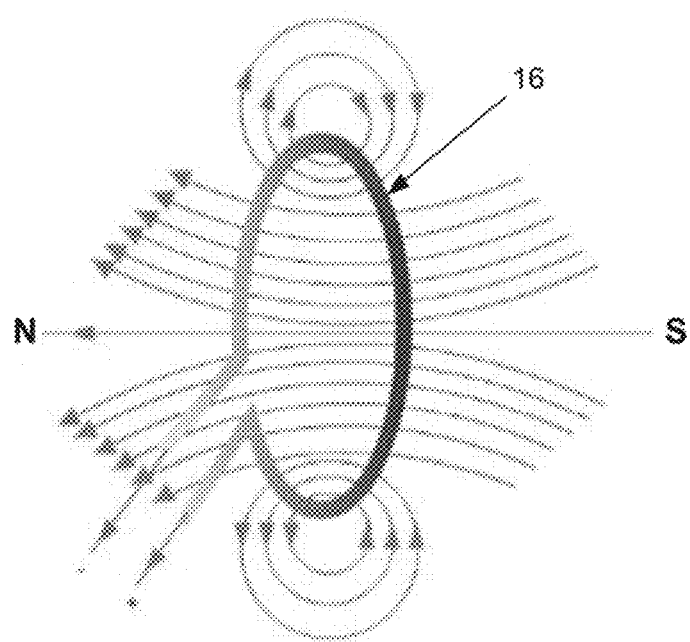
FIG. 4 is a diagram that illustrates the magnetic fields generated by a coil.

In an embodiment the coils 16 may have a trapezoidal shape as shown in FIG. 2, or a triangular shape as exemplified in FIG. 3. Other shapes are also possible without departing from the scope of the disclosure. When an electric current is fed into the coil 16, a magnetic field is generated which is substantially perpendicular to the plane that is defined by the coils 16, as exemplified in FIG. 4.

Figure 5:
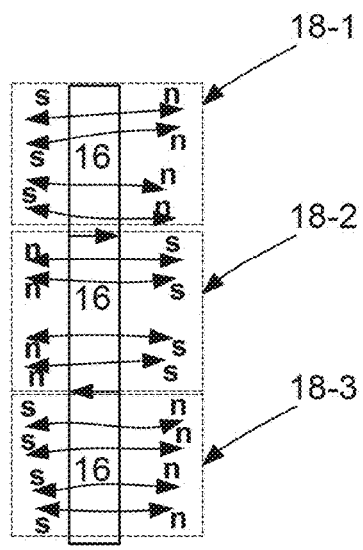
FIG. 5 is a diagram that illustrate the magnetic fields generated by a stator plate in accordance with an embodiment.

In an embodiment, the coils 16 may be wired so that adjacent coils receive electric currents with opposite polarities. For example, a sinusoidal/square-shaped current may be fed into a given coil and a de-phased (shifted) version of the same current may be fed into the adjacent coil such that the magnetic fields generated by adjacent coils may have different directions as exemplified in FIG. 5 which illustrates different magnetic fields 18-1 to 18-3 having opposite directions. In an embodiment, a controller may be used for generating the electric current for the different coils using a DC battery such as a lithium battery, acid based battery and so on.

Figure 6:
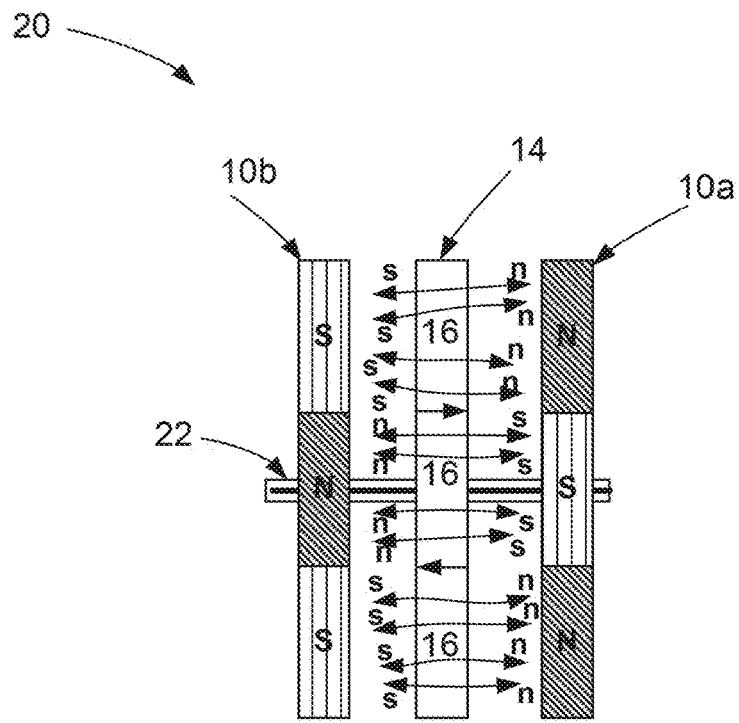
FIG. 6 is a top view of a non-limiting example of stator-rotor arrangement in a wheel assembly in accordance with the present embodiments.

FIG. 6 is a top view of a non-limiting example of a wheel assembly, in accordance with an embodiment. As shown in FIG. 6, the wheel assembly 20 comprises a rotor comprising rotor plates 10a and 10b, and a stator unit 14 provided between the rotor plates 10a and 10b. The rotor plates 10 rotate around a shaft 22 using bearings or the like. Other arrangements are also possible whereby the rotor plates may be connected to a rotation shaft while the stator plate 14 is connected to the chassis of the vehicle.

As shown in FIG. 6, the rotor plates 10 may be installed so that so that corresponding magnets of the plate 10a face magnets having opposite polarities of plate 10b. In operation, when the electric current is fed into the coils 16, a magnetic field is generated as discussed above which repels the magnets 16 of both plates 10a and 10b, thus, causing rotation of the rotor plates 10a and 10b around the shaft 22. Accordingly, the present arrangement causes both poles of the magnetic field (north and south) to be utilized, thus, reducing energy losses in the wheel assembly 20. Furthermore, due to the rotation of the rotor plates 10a and 10b around the stator plate 14, automatic ventilation is generated which dissipates the heat from the coils 16 and the magnets 12.

Figure 7:
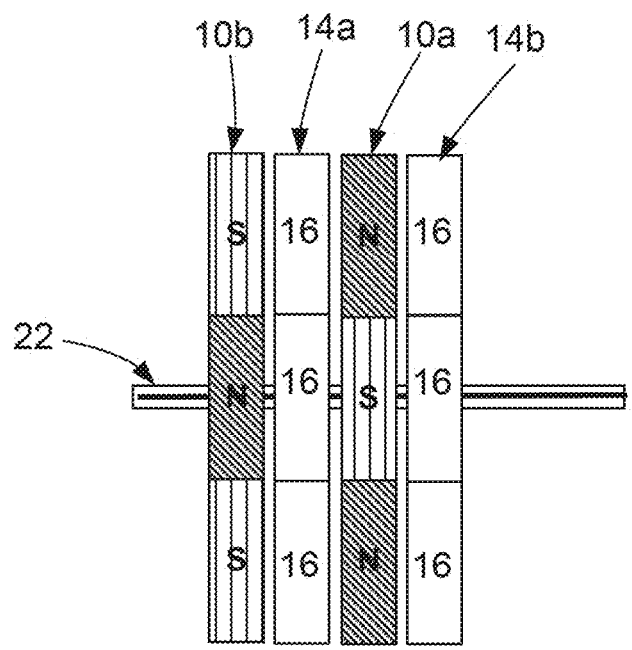
FIG. 7 is a top view of another example of a wheel assembly, in accordance with another embodiment.
Figure 8:
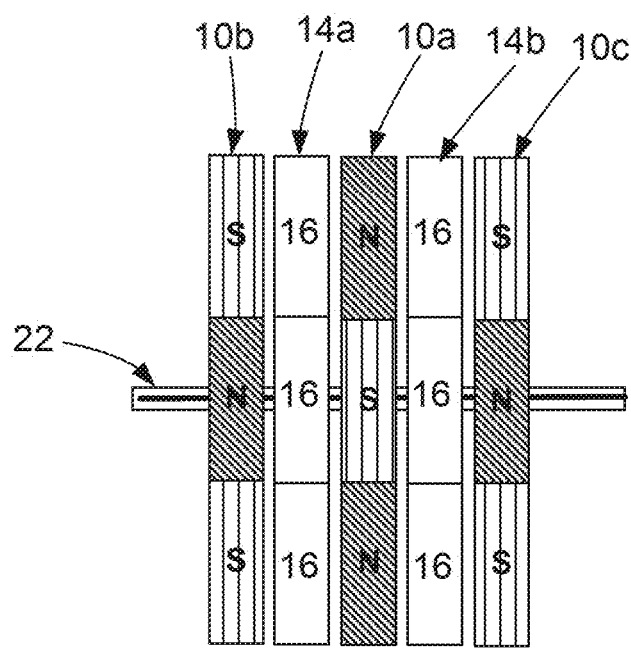
FIG. 8 is a top view of yet another example of a wheel assembly, in accordance with an embodiment.

If more power/torque is needed, an additional stator plate 14b may be added as exemplified in FIG. 7. However, in order to optimally benefit from the electric current injected into the stator unit 14b, an additional rotor plate 10c would have to be added as exemplified in FIG. 8.

Figure 9:
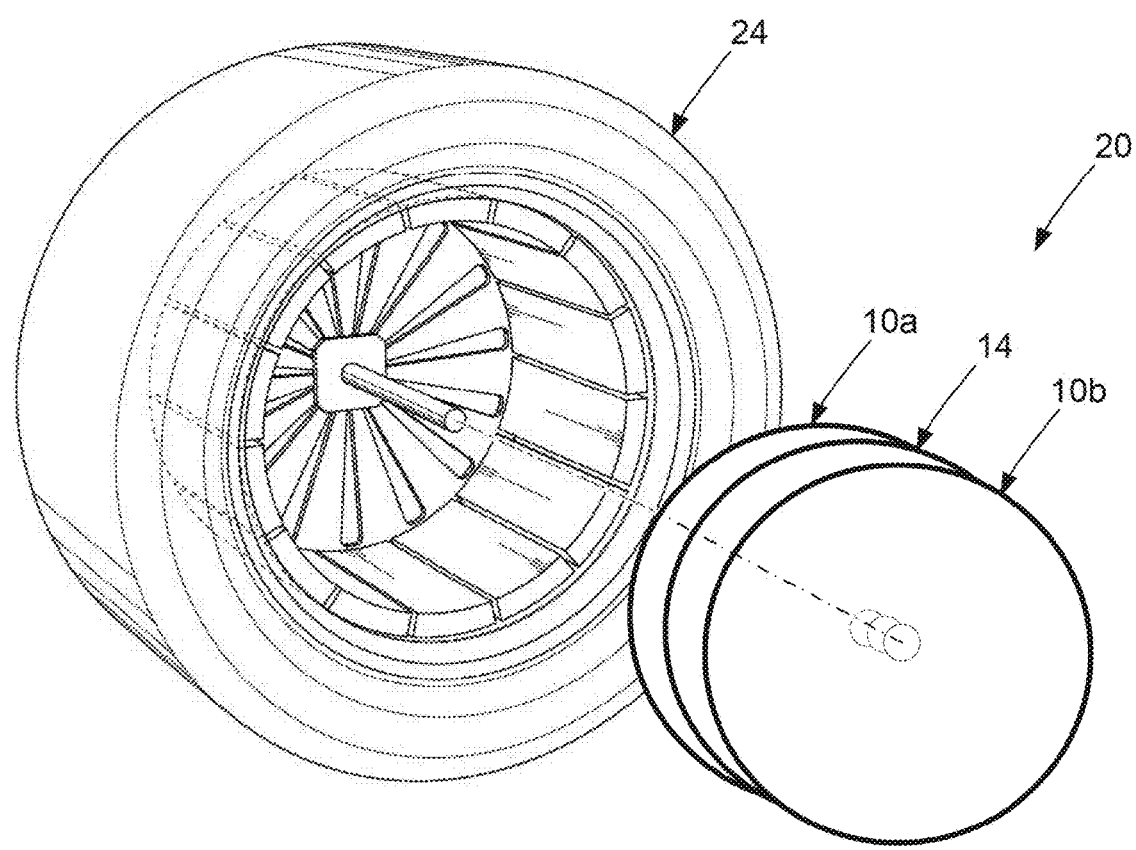
FIG. 9 is an exploded view of a rim/wheel with the wheel embassy embedded therein.

The wheel assembly 20 may be provided within an existing rim/wheel 24 as exemplified in FIG. 9, wherein the stator plate may be connected to the chassis of the car and the wheel may be connected to the rotor plates 10 so that the when 24 rotates as a result of the electric current fed into the coils 16 of the stator plate 14. Other arrangements are also possible without departing from the scope of the present disclosure.

The plate may be made from non-magnetized and preferably light metals such as aluminum, fiber glass, plastic, wood, or a composite material that is permeable to magnetic waves.

A vehicle including a wheel assembly in accordance with the present embodiments may be lightweight and may have a larger storage capacity since the central motor and transmission are not present.

Figure 10:
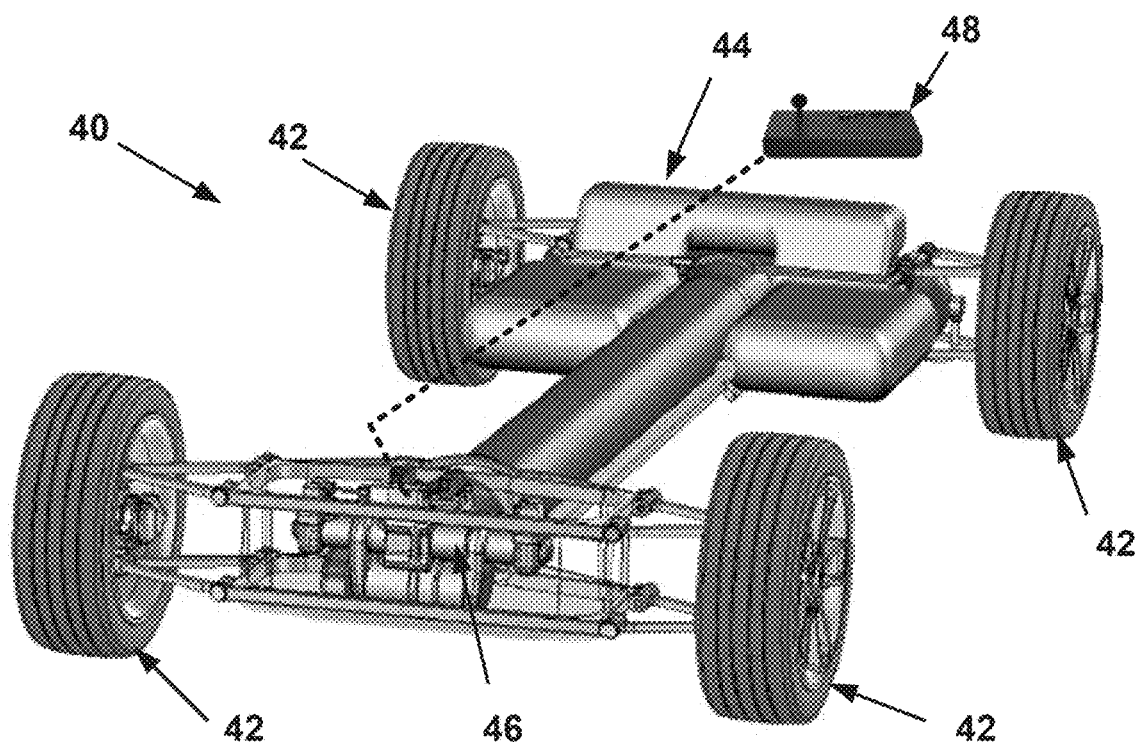
FIG. 10 illustrates an example of a vehicle including at least one wheel having the wheel assembly embedded therein, in accordance with an embodiment.

FIG. 10 illustrates an example of a vehicle including at least one wheel having the wheel assembly embedded therein, in accordance with an embodiment. As shown in FIG. 10, a vehicle 40 comprises a plurality of wheels 42. At least one of these wheels 42 comprising the electric wheel assembly 20 embedded therein (but not shown in FIG. 10). In an embodiment, all four wheels 42 are provided with a wheel assembly 20 embedded therein. In another embodiment, the rear or front wheels 42 are provided with the wheel assembly 20 embedded therein.

The vehicle 40 comprises a battery 44. The battery may be charged by plugging into a power source in the wall or by a generator/break system/solar panel or the like on board of the vehicle 40 using known techniques. The wheels 42 do not require a conventional transmission system to rotate, and may be individually controlled by a central computer 46 to accelerate and decelerate them by varying the current intensity using an electric switch 48.

The wheel assembly 20 may be used in a variety of different applications including but not limited to windmills, electric pumps, cars, motorcycles etc.

In another embodiment, the wheels may be used for generating electricity. For example, the wheels may be used for breaking electromagnetically by converting the kinetic energy of the car into an electric current which may be used for charging the battery of the car. It should also be noted that use of the wheel assembly 20 for the generation of electricity is not limited to vehicles. The wheel assembly may be used in hydro-electric turbines, and wind turbines for generating energy from renewable sources.

Figure 11A:
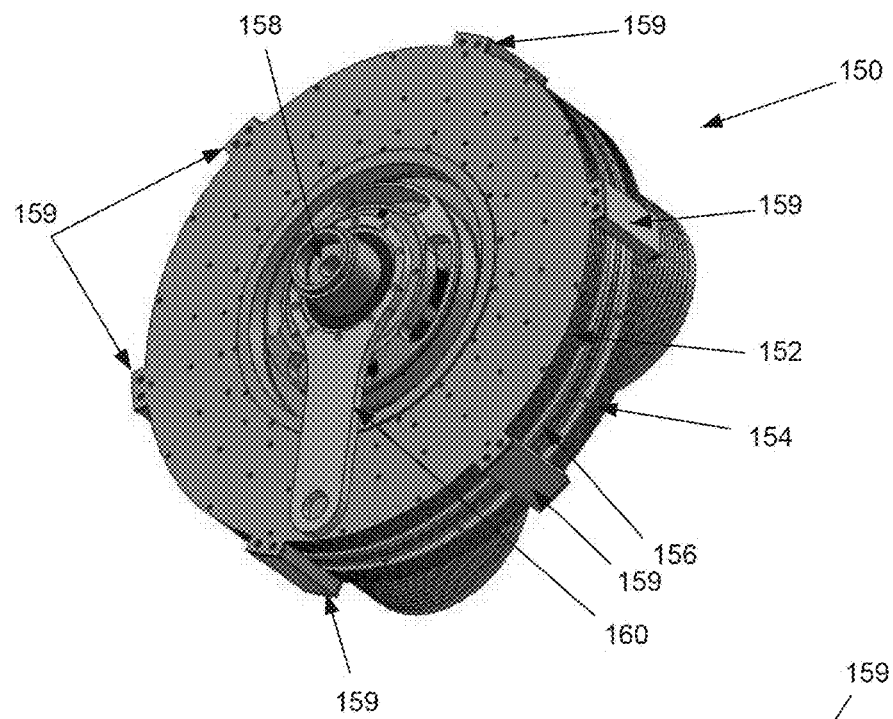
FIGS. 11a and 11b illustrate different views of an exemplary wheel assembly in accordance with an embodiment.
Figure 11B:
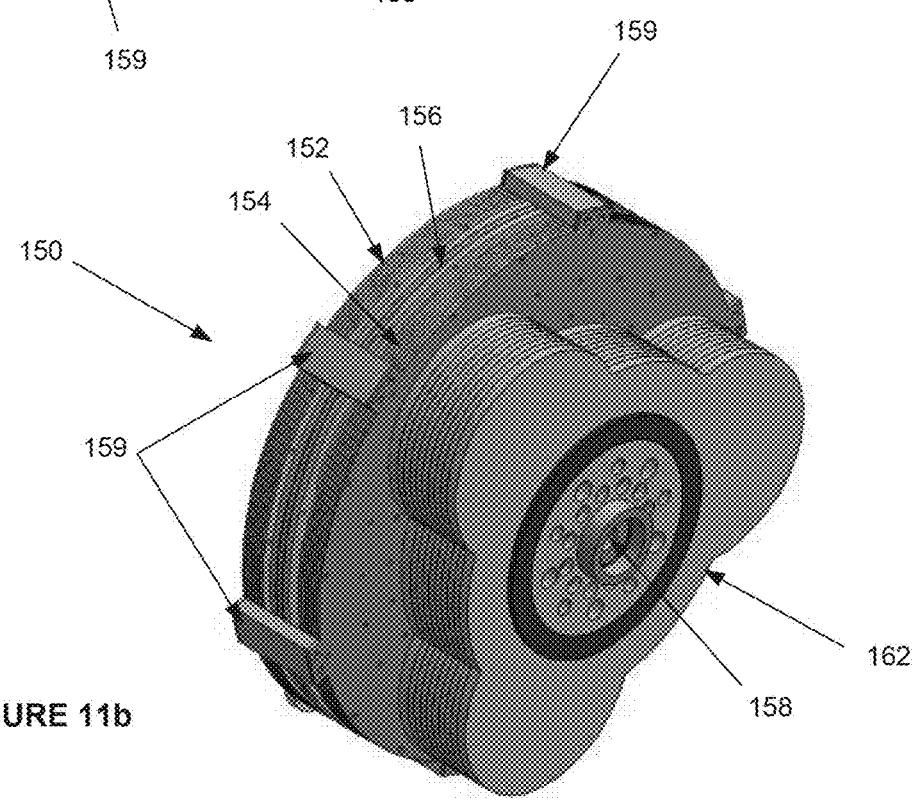
Figure 12:
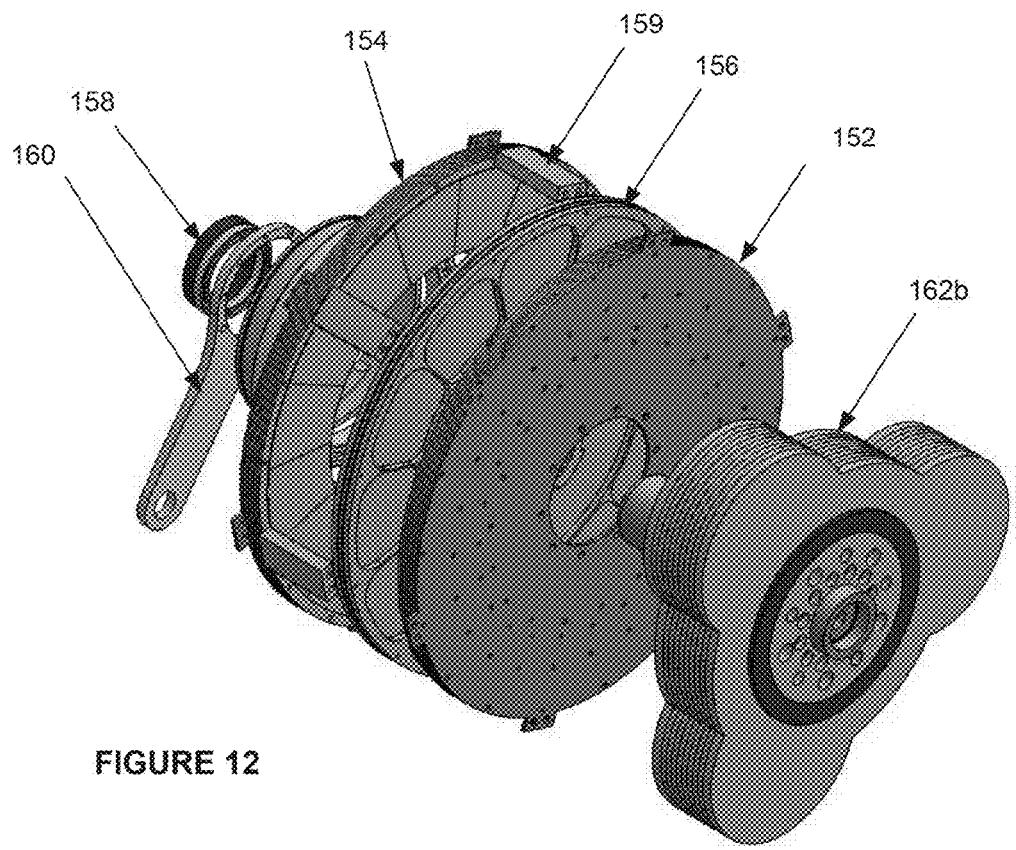
FIG. 12 is an exploded view of the exemplary wheel assembly of FIGS. 11a&11b.

FIGS. 11a and 11b illustrate different views of an exemplary wheel assembly in accordance with an embodiment, and FIG. 12 is an exploded view of the exemplary wheel assembly of FIGS. 11a&11b.

As shown in FIG. 11a&11b, the exemplary wheel assembly 150 comprises a first wheel shaped rotor 152, a second wheel rotor 154, and a wheel shaped stator 156 provided between the two wheel shaped stators 152 and 156. The rotors 152 and 154 and the stator 156 are co-axially attached to a rotation shaft 158. The rotors 152 and 154 may be attached together using one or more linking members 159. The wheel assembly may also include attachment means such as an arm 160 for attaching the wheel assembly 150 to the chassis of the vehicle. In an embodiment, the wheel assembly may also include a gear box 162 for controlling the torque and rotation speed of the rubber wheel 42 which is attached to the rotation shaft and for transforming the in which the wheel assembly 150 is provided.

It is to be noted that the gear box and attachment means illustrated herein are optional, and that different configurations of attachment means and gearboxes may be used without departing from the scope of the invention as defined in the claims. Two different embodiments of gearboxes 162a and 162 b are illustrated below.

Figure 13:
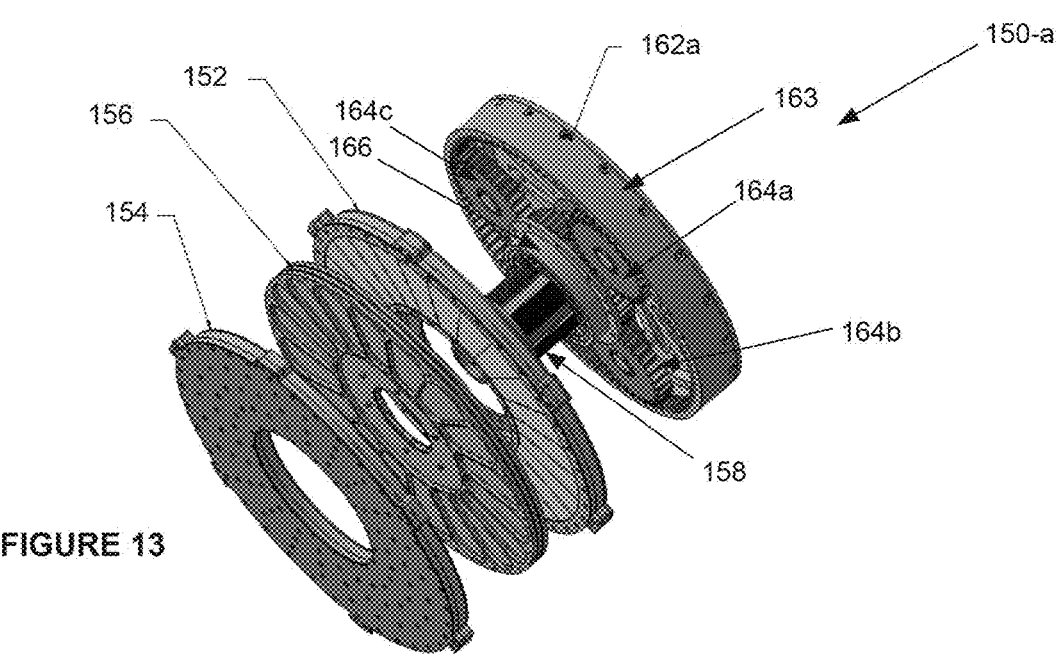
FIG. 13 is an exploded view of an exemplary wheel assembly having a different transmission/gearbox.

FIG. 13 is an exploded view of an exemplary wheel assembly having a different transmission 162a. Starting from the left, the wheel assembly 150-a comprises a wheel shaped rotor plate 154 followed by the wheel shaped stator plate 156 followed by the rotor plate 152 followed by a gearbox 162a (aka transmission). In an embodiment, the exterior plate 163 of the gearbox 162a is rotatably attached to the adjacent rotor plate 152 whereby rotation of the exterior plate 163 of the transmission 162a causes each of the gears 164a, 164b and 164c to rotate around a central gear 166 which is attached to the rotation shaft 158 that is to be attached to the wheel 42 of the vehicle for rotating the wheel 42 and moving the vehicle.

Figure 14A:
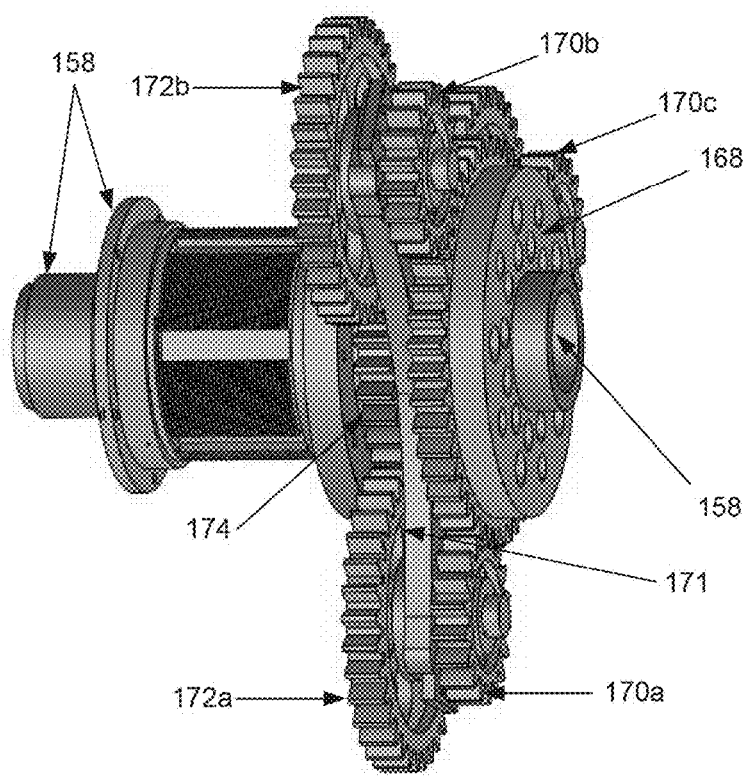
FIG. 14a illustrates another example of a gearbox that may be used with the wheel assembly, in accordance with another embodiment.
Figure 14B:
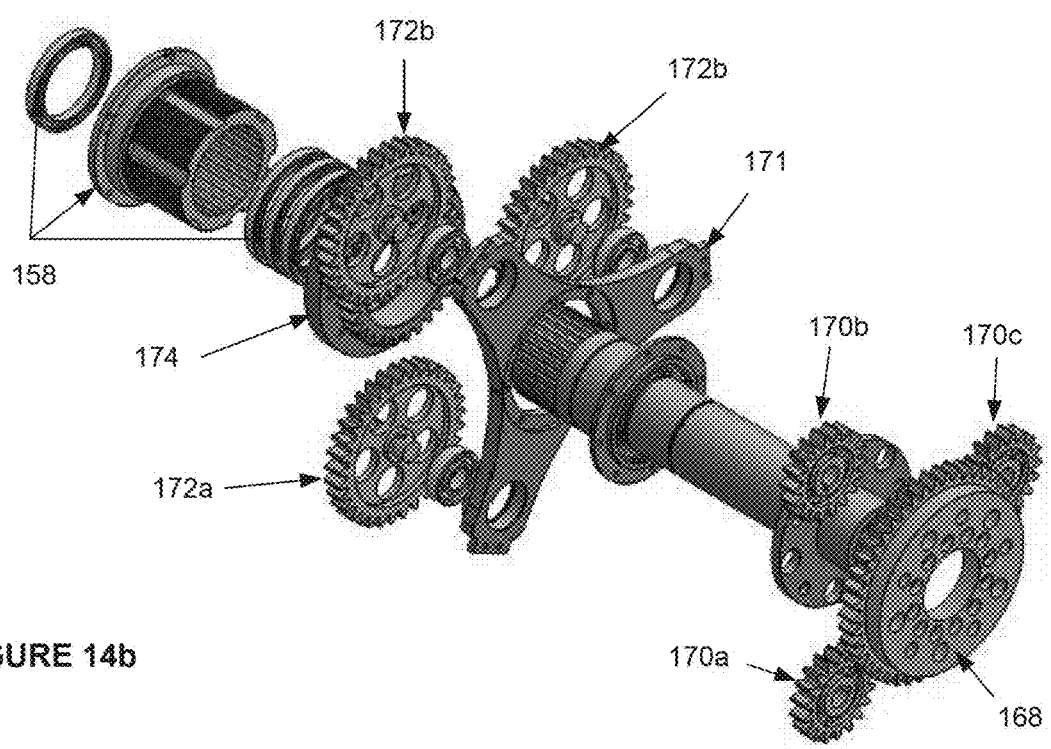

FIG. 14a illustrates another example of a gearbox 162b that may be used with the wheel assembly 150, in accordance with another embodiment. In the exemplary gearbox of FIG. 13a, the rotor 152 is connected to the gear 168, and thus, rotation of the rotors 152 and 154 causes the gear 168 to rotate and also rotate the smaller gears 170a, 170b and 170c each of which is attached to another gear 172 of a larger diameter across a triangular holding plate 171. The gears 172 (172a, 172b and 172c(not shown)) are provided around a central gear 174 which is connected to the rotation shaft 158. Thereby, causing the rotation of the rotors 152&154 at a first speed to be translated to the rotation shaft 158 at a desired second speed. FIG. 14b is an exploded view of the gearbox 162b of FIG. 14a.

Figure 15:
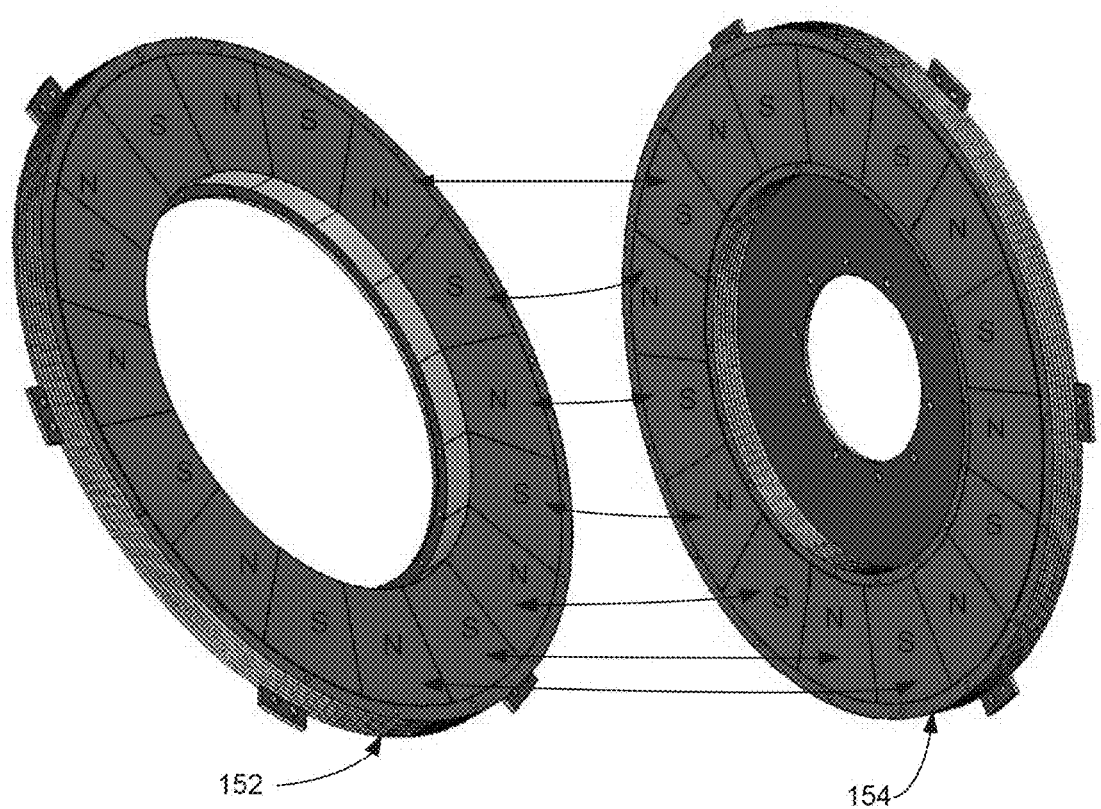
FIG. 15 illustrates an exemplary configuration of the rotor plates in accordance with an embodiment.

FIG. 15 illustrates an exemplary configuration of the rotor plates 152 and 154. As discussed above, the rotor plates are co-axially and rotatably attached to a common rotation shaft and/or gear, and they are provided on each side of the stator plate 156. The rotor plates include a plurality of permanent magnets such that adjacent magnets of a given magnet have different polarities as exemplified in FIG. 15. In an embodiment, each magnet of each rotor plate corresponds in position to one of the coils. Furthermore, corresponding magnets of different rotor plates have different polarities. The rotor plates are also secured to each other to maintain such configuration even when the rotors rotate.

Figure 16:
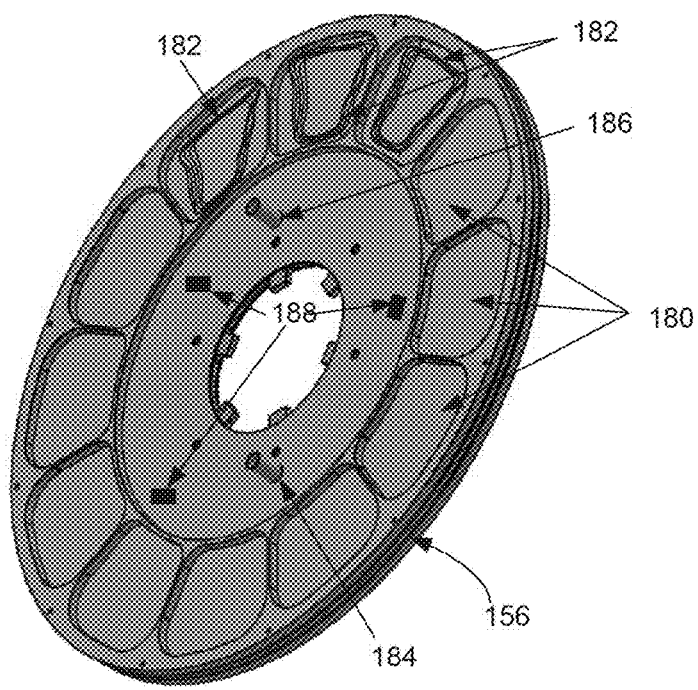
FIG. 16 is an elevational view of an exemplary stator plate, in accordance with an embodiment.

FIG. 16 is an elevational view of an exemplary stator plate 156, in accordance with an embodiment. In the example of FIG. 16, the stator plate 156 comprises a wheel shaped plate comprising a plurality of apertures 180, each aperture being dimensioned to receive a coil 182 therein for generating a magnetic field across the surface of the stator plate for reacting with the permanent magnets in the rotors 152 and 154. In an embodiment, apertures 180 may be provided on both sides of the plates so that the coils may be provided on both sides of the stator plate 156.

Due to their position at or near the end of the rotor plates the magnets may have the shape of a trapezoid. The corresponding coils may have similar shapes for optimum results.

In an embodiment, the stator plate 156 may define a wheel shaped hollow membrane which is made from a material which is permeable to magnetic fields. In an example, the stator plate may be made from one or more of: a composite material, a fiber glass, a temperature resistant type of plastic etc. In an embodiment, the stator plate may include a fluid inlet 184 and a fluid outlet 186 in the stator plate 156 for running a cooling fluid within the stator plate for reducing the heat generated by the coils 182 during operation of the wheel assembly. The fluid may be circulated within the stator plate 156 using a fluid pump or the like. The fluid may be run through a radiator (not shown) in the vehicle and circulated back into the stator plate 156 for cooling the latter. One or more heat sensors 188 may be provided on the stator plate 156 for sensing the temperature of the latter and reporting to a central computer for controlling the operation of the fluid pump.

Figure 17:
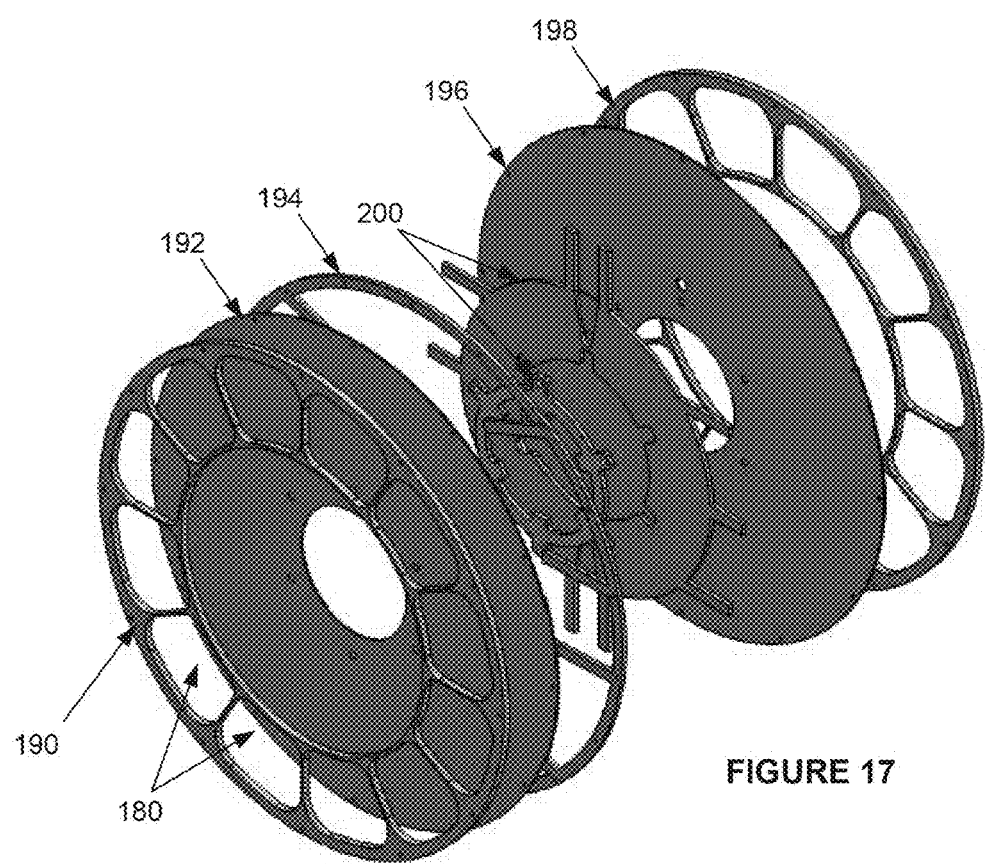
FIG. 17 is an exploded view of the exemplary stator plate of FIG. 16.

FIG. 17 is an exploded view of an exemplary stator plate. Starting from the left, the exemplary stator plate shown in FIG. 17 comprises a first coil receiving piece 190 defining a plurality of apertures for receiving the coils therein on one side of the stator plate 156, a first circular plate 192 which is permeable to magnetic waves, an external joint/seal 194, a second circular plate 196 which is permeable to magnetic waves, and a second coil receiving pieces 198 defining a plurality of apertures for receiving the coils therein on the other side of the stator plate 156, and an internal joint/seal 200 to seal the stator plate from the side of the shaft. The internal seal 200 may be configured to direct the fluid within the stator plate for cooling purposes.

Needless to say, when coils are provided on both sides of the stator plate 156 the coils should be wired so that the magnetic field of each coil on each side of the stator plate would be added to the magnetic field of the other coil on the other side so that the magnetic fields do not cancel each other.

In an embodiment, a gap may be provided between the stator plate 156 and each rotor plate for allowing rotation of the rotor plates around the rotation shaft on each side of the stator plate. In an embodiment, the width of the gap is selected to compensate for the increase in dimensions associated with overheating.

Figure 18:
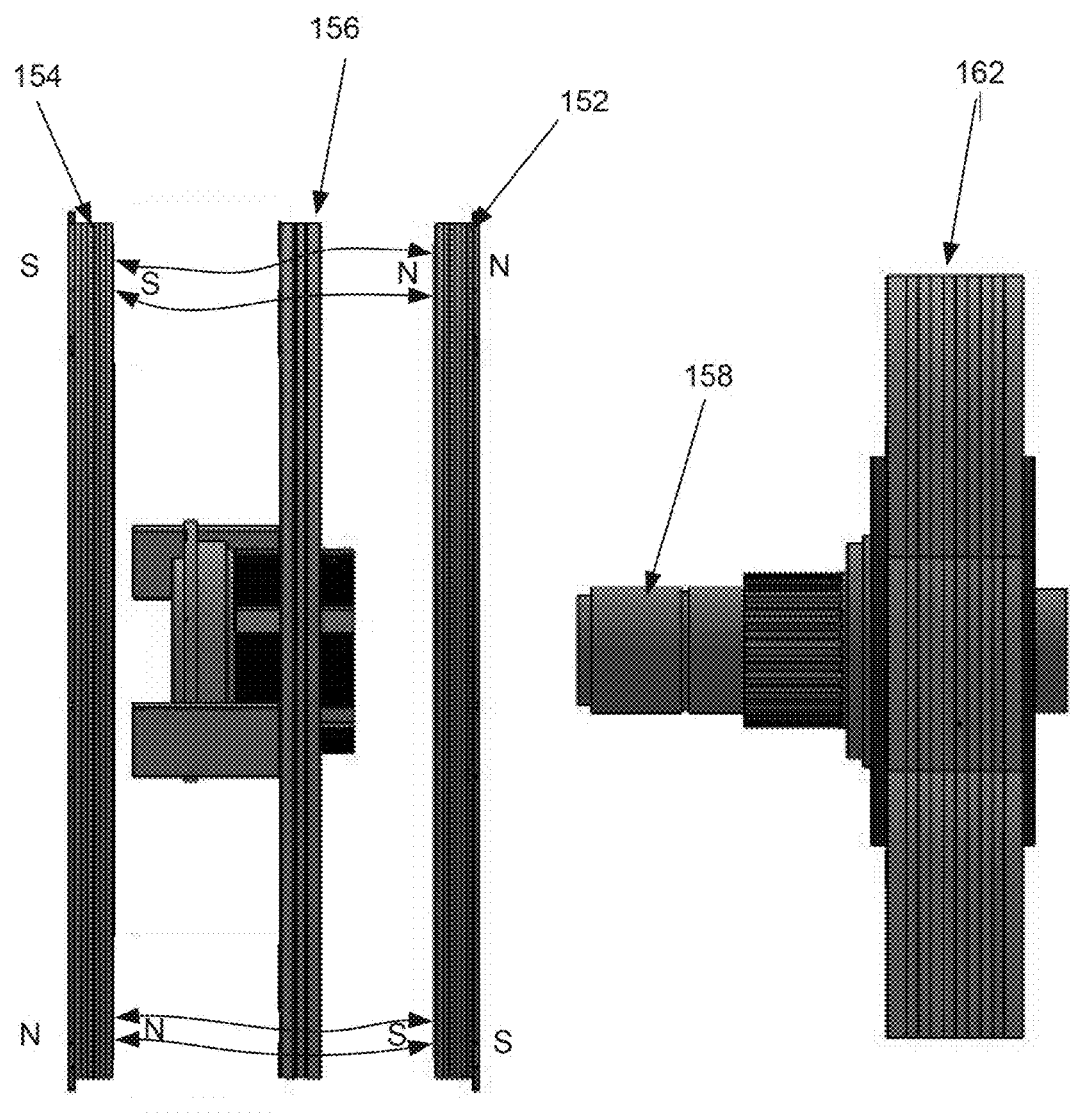
FIG. 18 illustrates the conceptual operation of a wheel assembly in accordance with an embodiment.

FIG. 18 illustrates the conceptual operation of a wheel assembly in accordance with an embodiment. As discussed above in connection with FIGS. 5 and 6, the coils provided in the stator plate 156 are configured to radiate a magnetic field that is perpendicular to the surface of the stator plate 156. Such magnetic field on one side pushes the adjacent magnet in rotor 152 and on the opposite side pushes the adjacent magnet in rotor 154 since corresponding magnets in the rotors 152 and 154 have opposite orientations. Accordingly, the magnetic generated by each coil is used on both sides to push corresponding magnets in the rotors 152 and in the rotor 154, thereby reducing magnetic losses and increasing efficiency battery life. A variety of configurations may be used for the coiling and types of electric currents fed into the coils. A suitable example may be regular 3 phase brushless.

While preferred embodiments have been described above and illustrated in the accompanying drawings, it will be evident to those skilled in the art that modifications may be made without departing from this disclosure. Such modifications are considered as possible variants comprised in the scope of the disclosure.

For example, although the embodiments describe two or more rotor plates, it is possible to implement the wheel assembly using one stator plate and one rotor plate.

The invention claimed is:

1. A wheel assembly comprising:
a first shaft;
a first wheel-shaped rotor plate rollably connected to the first shaft, and comprising a plurality of permanent magnets;
a second wheel-shaped rotor plate rollably connected to the first shaft, and comprising a plurality of permanent magnets;
a wheel-shaped stator plate comprising a plurality of coils;
wherein the stator plate is fixedly attached to the first shaft and provided between the first rotor plate and the second rotor plate; and
wherein adjacent permanent magnets surfaces facing the stator plate of each rotor plate have different polarities, and corresponding permanent magnet faces of each rotor plate have different polarities; and
wherein the coils are configured to generate a magnetic field extending across the surface of the stator plate in a substantially perpendicular manner such that the magnetic field generated by each coil reacts with corresponding magnets in both the first rotor plate and the second rotor plate to cause rotation of the rotor plates around the first shaft.

2. The wheel assembly of claim 1, wherein the coils are configured so that a given magnetic field generated by a given coil repels a first permanent magnet in the first rotor on one side thereof and simultaneously repels a second permanent magnet in the second rotor plate on the other side.

3. The wheel assembly of claim 1, wherein adjacent coils generate magnetic fields having opposite polarities.

4. The wheel assembly of claim 1, wherein the stator plate defines a hollow membrane and comprises a fluid inlet and a fluid outlet for running a cooling fluid there through for reducing overheating during operation of the wheel assembly.

5. The wheel assembly of claim 1, wherein the first rotor plate and the second rotor plate are attached together.

6. The wheel assembly of claim 1, further comprising a set of coils on each side of the stator plate.

7. The wheel assembly of claim 6, wherein the stator plate is made of a material which is permeable to magnetic fields.

8. The wheel assembly of claim 7, wherein the material is one of: fiber glass, composite material, and heat resistant plastic.

9. The wheel assembly of claim 1, further comprising a gearbox attached to the first shaft, the gearbox being configured to change the rotation speed of the first shaft into a new rotation speed and output the new rotation speed using a second shaft for attachment to a wheel of a vehicle.

10. The wheel assembly of claim 1, wherein the permanent magnets and the coils are provided at or near an external surface of the first and second rotor plates and the stator plate, respectively.

11. The wheel assembly of claim 1, wherein the permanent magnets include one or more of: rare earth magnets, neodymium magnets, and samarium-cobalt magnets.

12. A vehicle comprising:
a chassis; and
one or more wheels rollably attached to the chassis for driving the vehicle on the ground; at least one of the wheels including a wheel assembly comprising:
a first shaft;
a first wheel-shaped rotor plate rollably connected to the first shaft, and comprising a plurality of permanent magnets;
a second wheel-shaped rotor plate rollably connected to the first shaft, and comprising a plurality of permanent magnets;
a wheel-shaped stator plate comprising a plurality of coils;
wherein the stator plate is fixedly attached to the first shaft and provided between the first rotor plate and the second rotor plate; and
wherein adjacent permanent magnets surfaces facing the stator plate of each rotor plate have different polarities, and corresponding permanent magnet faces of each rotor plate have different polarities; and
wherein the coils are configured to generate a magnetic field extending across the surface of the stator plate in a substantially perpendicular manner such that the magnetic field generated by each coil reacts with corresponding magnets in both the first rotor plate and the second rotor plate to cause rotation of the rotor plates around the first shaft.

13. The vehicle of claim 9, wherein the vehicle comprises a radiator and the stator plate defines a hollow membrane and comprises a fluid inlet and a fluid outlet operably connected to the radiator for running a cooling fluid there through for reducing overheating during operation of the wheel assembly.

14. The vehicle of claim 9, further comprising a set of coils on each side of the stator plate.

15. The vehicle of claim 9, wherein the stator plate is made of a material which is permeable to magnetic fields.

16. The vehicle of claim 15, wherein the material is one of: fiber glass, composite material, and heat resistant plastic.

17. The vehicle of claim 9, further comprising a gearbox attached to the first shaft, the gearbox being configured to change the rotation speed of the first shaft into a new rotation speed and output the new rotation speed using a second shaft for attachment to the at least one wheel.

18. The vehicle of claim 9, wherein a magnetic field generated by a given coil repels a first permanent magnet in the first rotor on one side and simultaneously repels a second permanent magnet in the second rotor plate on the other side.

19. The vehicle of claim 9, wherein adjacent coils generate magnetic fields having opposite polarities.

20. A wheel assembly comprising:
a shaft;
a wheel-shaped rotor rollably connected to said shaft, and comprising two rotor plates, each rotor plate comprising a plurality of magnets provided at or near an edge of the rotor plate, wherein adjacent magnets faces have opposite polarities, and respective magnet faces of each rotor plate have opposite polarities;
a wheel shaped stator comprising a stator plate statically connected to the shaft and provided between the two rotor plates; said stator plate comprising a plurality of coils, said coils being wired so that adjacent coils generate magnetic fields with opposite directions;
wherein the magnetic field generated by the coils extends across the stator plate and repels the magnets of both rotor plates causing rotation of the rotor plates around the shaft.

* * * * *